(12) United States Patent
Everett

(10) Patent No.: US 6,454,197 B1
(45) Date of Patent: Sep. 24, 2002

(54) CONTROLLING TENSION IN RECORDING MEDIA

(75) Inventor: Thomas A. Everett, Dracut, MA (US)

(73) Assignee: ECRM, Inc., Tewksbury, MA (US)

( * ) Notice: Subject to any disclaimer, the term of this patent is extended or adjusted under 35 U.S.C. 154(b) by 0 days.

(21) Appl. No.: 09/595,189

(22) Filed: Jun. 16, 2000

(51) Int. Cl.$^7$ .............................................. B65H 59/38
(52) U.S. Cl. .................... 242/334.4; 242/421.4
(58) Field of Search .................... 242/334.4, 416, 242/417, 418, 412.2, 421.4

(56) References Cited

U.S. PATENT DOCUMENTS

| | | | | |
|---|---|---|---|---|
| 2,469,706 A | * | 5/1949 | Winther | |
| 3,180,548 A | * | 4/1965 | Stafford | |
| 3,257,086 A | * | 6/1966 | Drenningq | |
| 3,981,459 A | * | 9/1976 | Urbanek et al. | |
| 4,286,757 A | * | 9/1981 | Wirth | |
| 4,469,291 A | * | 9/1984 | Treiber et al. | |
| 5,433,539 A | * | 7/1995 | German | |
| 5,735,474 A | * | 4/1998 | Narukami | |

* cited by examiner

Primary Examiner—William A. Rivera
(74) Attorney, Agent, or Firm—Hale and Dorr LLP

(57) ABSTRACT

Tension is controlled in a recording medium fed from a roll by detecting a rotational velocity of the roll as the recording medium is fed, and applying a torque to the roll to maintain tension in the recording medium. The torque applied by the motor is controlled based on the rotational velocity of the roll.

27 Claims, 11 Drawing Sheets

CONTROLLING TENSION IN RECORDING MEDIA

BACKGROUND OF THE INVENTION

This invention relates generally to controlling tension in a recording medium.

Recording media for imaging systems is stored in rolls in a media cassette or other type of storage area. Uneven tension in the recording media as it is fed from these rolls can cause problems, such as velocity disturbances and undesired directional steering. Velocity disturbances can cause imaging artifacts and dimensional inaccuracies in the resulting images. Directional steering, if subtle, can cause dimensional inaccuracies in the resulting images and, if severe, can result in recording media jams.

SUMMARY OF THE INVENTION

In general, in one aspect, the invention is directed to controlling tension in a medium fed from a roll. This aspect of the invention features detecting a rotational velocity of the roll as the medium is fed and applying a torque to the roll to maintain tension in the medium. The torque is applied by a motor that is controlled based on the rotational velocity of the roll. The invention may also include one or more of the following features.

A controller controls the torque applied by the motor by controlling an amount of current supplied to the motor. A switchable media cassette stores the roll of recording media. The motor is capable of applying sufficient torque to rewind the medium onto the roll. An encoder, such as a digital tachometer, measures the rotational velocity of the roll. The controller is a motor servo. A coupling is controlled by the motor to apply the torque to the roll. The coupling includes one or more pulleys.

Other features and advantages of the invention will become apparent from the following description, including the claims and drawings.

DESCRIPTION

Figure 1:
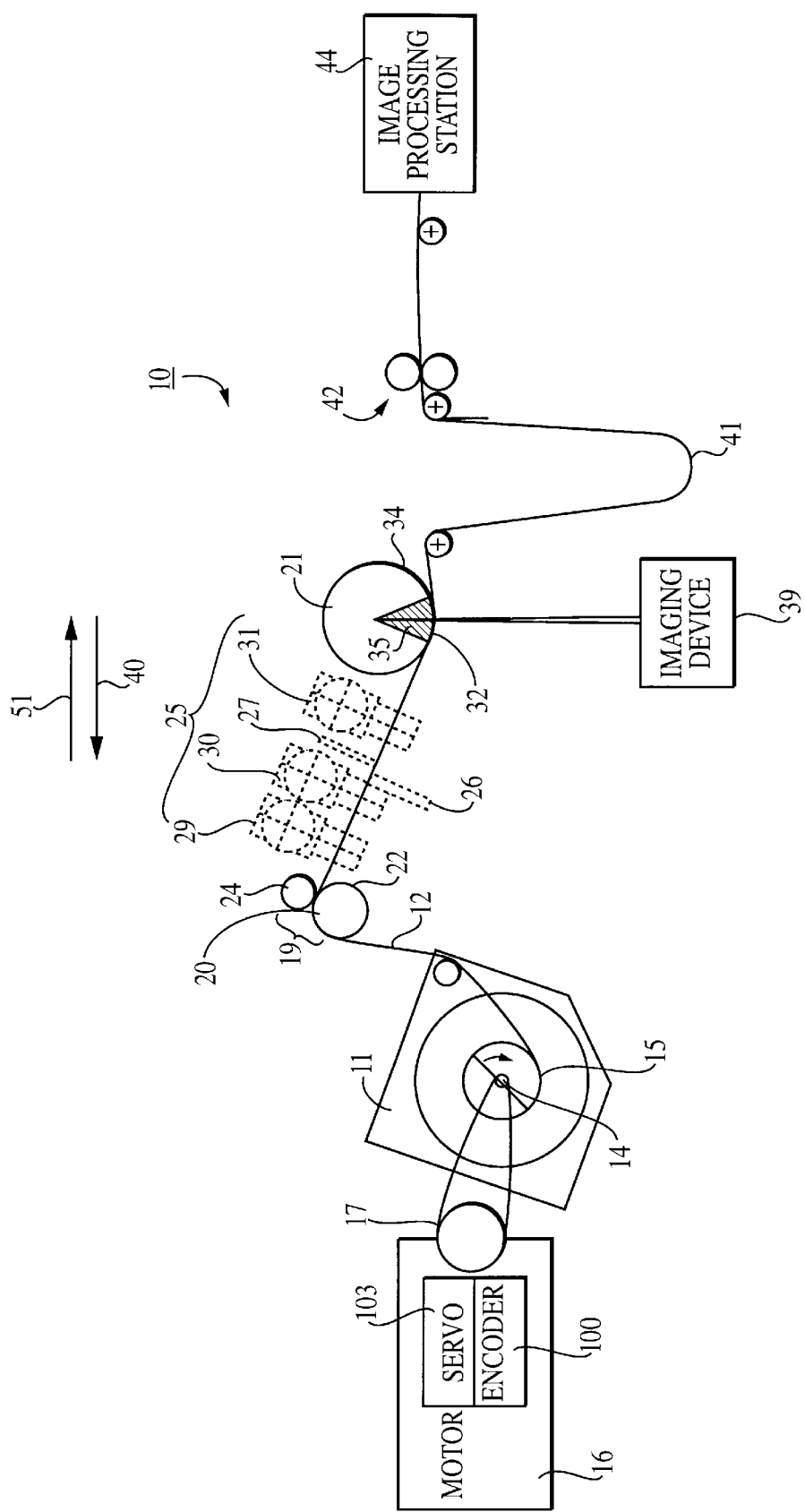
FIG. 1 is a block diagram of an imaging system.

FIG. 1 shows an imaging system 10. Imaging system 10 is a capstan imaging system. A capstan imaging system forms images onto recording media as the recording media is conveyed through the system. The components of imaging system 10 are described in detail below.

Imaging System

Imaging system 10 forms images onto recording media 12. Recording media 12 may be a web-like material, such as polyester film, plate, or paper, or any other type of material including, but not limited to, rolls of sheet metal or individual metal plates. Flat sheets of recording media are fed into imaging system 10 manually. Recording media stored in rolls is fed from cassette 11.

In this regard, a media spool 14 is included in cassette 11 for storing a roll 15 of recording media 12. A motor 16 controls the supply of recording media from media spool 14. Motor 16 operates to vary the torque on roll 15 as recording media 12 is fed from media spool 14 and to rewind recording media 12 back onto media spool 14. A coupling, such as one or more pulleys 17, controlled by motor 16 controls the rotation of media spool 14.

Recording media 12 is fed from cassette 11 to a guide, which, in this embodiment, is comprised of rollers 19. Rollers 19 transport recording media 12 from cassette 11, through imaging system 10, by clamping the recording media and pulling it through control point 20 to vacuum roller 21. Rollers 19 include capstan roller 22, which is driven by a motor (not shown), and pinch roller 24, which rotates in response to rotation of capstan roller 22.

Recording media 12 is fed from rollers 19 through several recording medium editing devices 25. The operation of recording medium editing devices 25 is controlled by a computer, microprocessor or other controller (not shown). Guides (not shown) are used to guide the recording media through these editing devices.

Recording medium editing devices 25 include a vacuum bar 26 for holding the recording media during editing and a cutting device 27 for cutting the recording medium, as described below. Also included among recording medium editing devices 25 are optional punch 29, leading edge punch 30, and trailing edge punch 31. These devices form (i.e., "punch") holes in recording media 12 as recording media 12 is conveyed through imaging system 10. Optional punch 29 forms holes, as directed, at predetermined locations of recording media 12. Trailing edge punch 31 forms holes at the trailing edge of a sheet in recording media 12 and leading edge punch 30 forms holes at the leading edge of the sheet. Other devices may also be included for altering recording media 12. For example, devices for forming slits or notches in recording media 12 may be included between vacuum roller 21 and rollers 19.

Vacuum roller 21 captures (i.e., receives) recording media 12 and pulls recording media 12 through an imaging plane 32, which is after control point 21. Imaging plane 32 is defined by a surface 34 of vacuum roller 21.

During transport, recording media 12 is held and pulled by a vacuum maintained by vacuum roller 21. As described in more detail below, vacuum roller 21 includes a stationary cavity 35 at (i.e., adjacent to) imaging plane 32. Holes (not shown in FIG. 1) are included in the surface of vacuum roller 21 so that when cavity 35 is evacuated, a vacuum is created through these surface holes. This vacuum acts as suction to pull recording media 12 during transport and imaging.

Because cavity 35 is stationary, imaging plane 32 (the vacuum area) remains stationary even though vacuum roller 21 rotates.

A controller (not shown) regulates the vacuum level of vacuum roller 21 so that the vacuum level is higher at the leading edge of recording media 12 than it is at other portions of recording media 12. The higher vacuum level at the leading edge of recording media 12 is needed to establish initial contact between vacuum roller 21 and recording media 12. Once contact between vacuum roller 21 and recording media 12 has been established, the vacuum level can be lowered without vacuum roller 21 losing hold of recording media. The location of the leading edge of recording media 12 is known by the controller that regulates the vacuum level. That is, the controller keeps track of timing information, such as the length of the recording media, the rate at which the recording media is fed, and when sheets are cut from the recording media. The vacuum level is regulated based on this information.

Typically, the vacuum level is between zero and three PSI (pounds per square inch), which holds recording media between four mils and eight mils thick (one mil=$\frac{1}{1000}$ of an inch). However, the invention is not limited to using any particular vacuum level or to use with recording media having a particular thickness. The vacuum level can be adjusted as desired and/or the size, number and positioning of the surface holes on vacuum roller 21 can be varied to change the amount of suction applied to recording media 12.

To keep recording media 12 taught between rollers 19 and vacuum roller 21, the rotational velocity of vacuum roller 21 is set greater than the rotational velocity of capstan roller 22 (and, thus, of rollers 19). Typically, the rotational velocity of vacuum roller 21 is 2% to 3% greater than that of rollers 19; however, the invention is not limited to these numbers. Alternatively, the rotational velocity of vacuum roller 21 and capstan roller 22 may be substantially equal, which will also result in an amount of tension in recording media 12.

As recording media 12 is transported through imaging plane 32 (i.e., the vacuum area), an imaging device 39 forms images onto the recording media at imaging plane 32. Because recording media 12 is maintained flush with the surface of vacuum roller 21 during imaging, images can be formed over virtually the entire surface of recording media 12, right up to its leading edge. By contrast, imaging systems that clamp recording media between pinch rollers and perform imaging behind such pinch rollers are unable to form images up to the leading edge of the recording media, since the leading edge of the recording media is clamped between the pinch rollers.

The imaging device in imaging system 10 includes a laser and optics (not shown) for scanning the laser over recording media 12 to expose recording media 12. Recording media 12 is typically treated with photosensitive chemicals or the like so that exposure to light from the laser will result in the formation of images. The laser and its associated optics are controlled by a computer, microprocessor or other controller (not shown).

Once an image is formed onto recording media 12, the direction of the recording media may be reversed for cutting and hole punching. That is, cassette 11, rollers 19, and vacuum roller 21 may be controlled to convey recording media 12 along the direction of arrow 40, so that a sheet can be cut from recording media 12. This process is described in more detail below.

Recording media 12 (either cut or uncut) is transported from vacuum roller 21 to media loop 41. Media loop 41 is "non-tensioned" recording media, meaning that no, or substantially no, force is applied to the recording media 12 in media loop 41. The absence of substantial force in media loop 41 reduces the chances that the recording media will be inadvertently pulled, thus causing imaging errors. A flap (not shown) or other device may be provided to "open" and "close" media loop 41 as needed.

Transport capstan rollers 42 clamp recording media 12 and transport recording media 12 to an image processing station 44. Image processing station 44 contains chemicals, inks, and any other materials for developing the images formed by the laser onto recording media 12. A flap (not shown) or other device may be provided to allow recording media 12 to enter image processing station 44.

Figure 2:
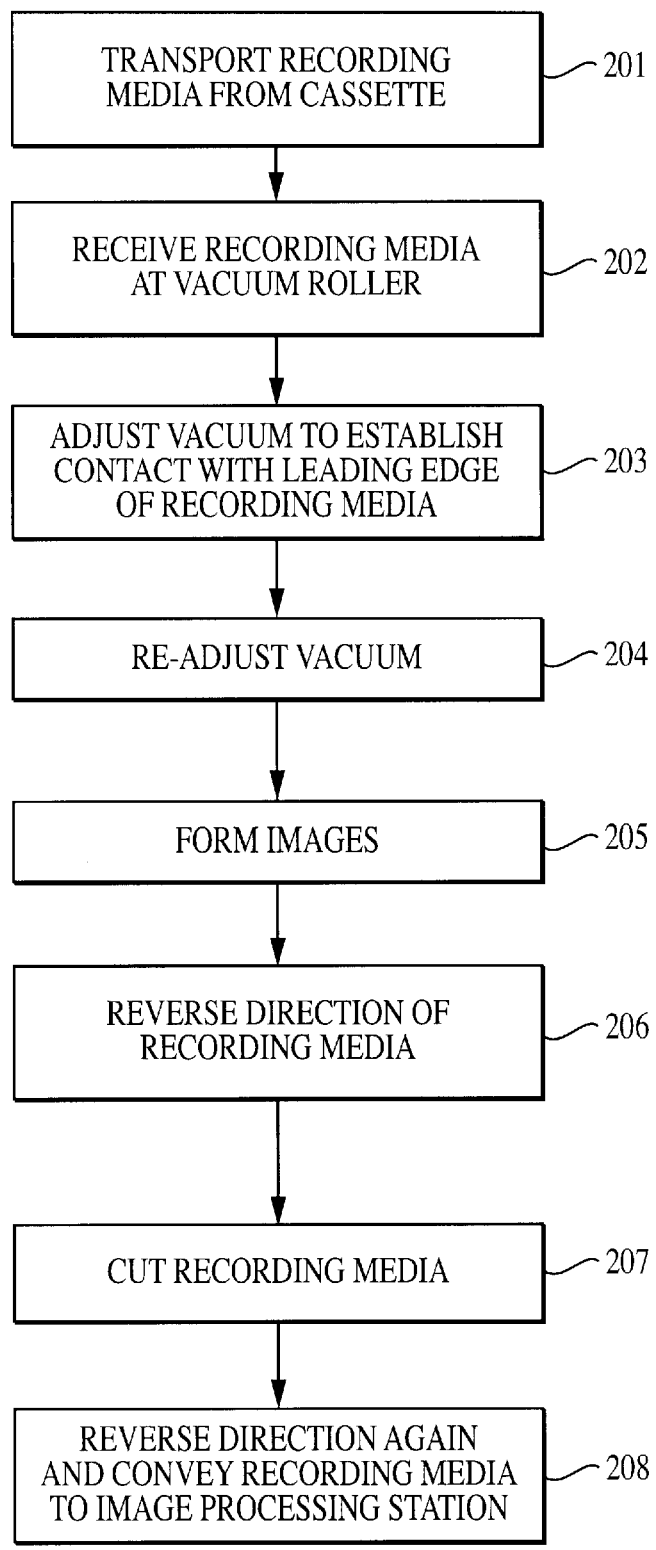
FIG. 2 is a flowchart showing a process for forming images using the imaging system.
Figure 3:
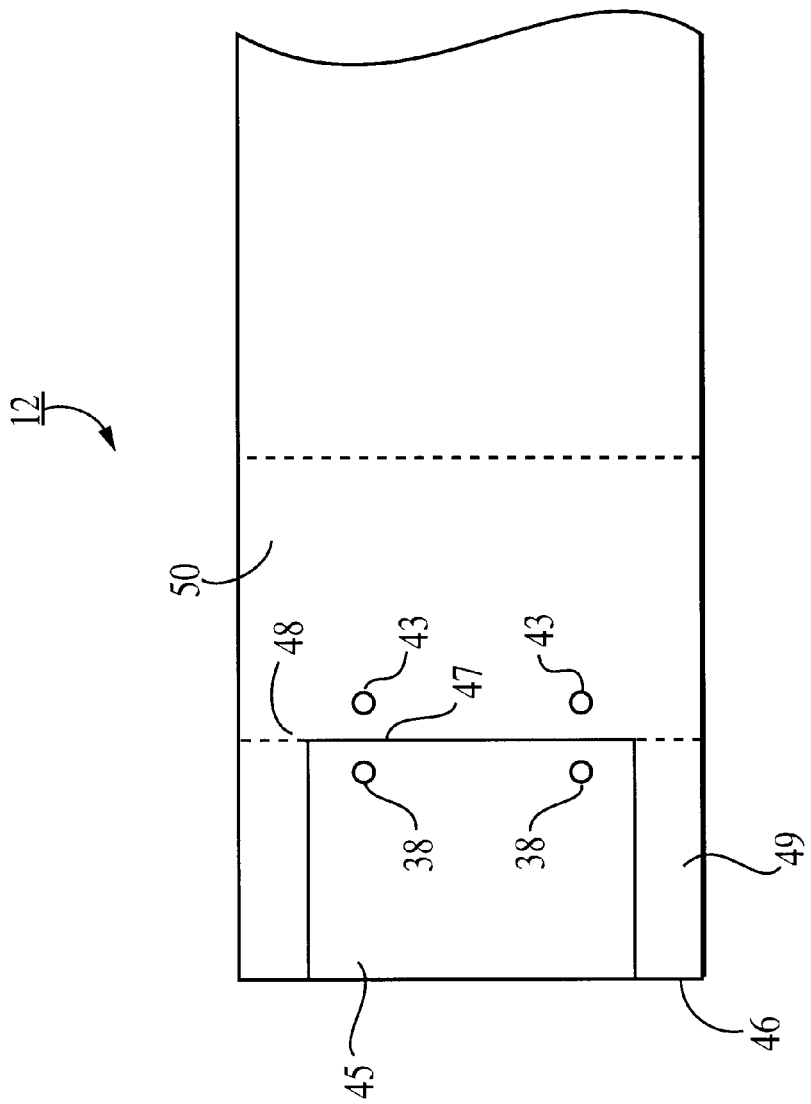
FIG. 3 shows recording media used in the imaging system and images formed onto the recording media.

FIG. 2 is a flowchart showing how recording media 12 is conveyed through imaging system 10. Recording media 12 is transported/conveyed (201) from recording media cassette 11 by rollers 19. Recording media 12 is then subjected to any editing, such as hole punching or the like, performed by recording medium editing devices 25. Vacuum roller 21 receives (202) recording media 12. The vacuum level of vacuum roller 21 is adjusted (203), e.g., increased, so that vacuum roller 21 can establish contact with, and hold, the leading edge of recording media 12. The vacuum level of vacuum roller 21 is then re-adjusted (204), e.g., decreased, once contact is established between vacuum roller 21 and recording media 12. The laser is scanned across the surface of recording media 12 at imaging plane 32 to expose the recording media and form (205) images. An example of an image 45 formed on a sheet of recording media 12 is shown in FIG. 3. Image 45 can be formed virtually right up to the leading edge 46 of recording media 12.

Recording media 12 may then be cut (207) and the trailing edge thereof punched with holes. To do this, the direction of recording media 12 is reversed, as described above, and cutting device 27 cuts a sheet from recording media 12. For example, recording media 12 may be cut along the trailing edge 47 of image 45 (FIG. 3) to form sheet 49. At or about the same time, trailing edge punch 31 may form holes 38 near the trailing edge 47 of the cut recording media 12 (i.e., sheet 49). Leading edge punch may, at or about the same time, form holes 43 corresponding to a leading edge 48 of a next sheet 50 to be cut from recording media 12.

The direction of recording media 12 is then re-set to the "forward" direction (arrow 51 of FIG. 1), meaning the "imaging" direction, and the cut sheet of recording media is conveyed by vacuum roller 21 to media loop 41. Thereafter, the cut sheet of recording media is conveyed (208) by rollers 42 to image processing station 44, where the image formed thereon by the laser (or whatever imaging device is used) is developed.

Vacuum Roller

As noted above, vacuum roller 21 captures recording media 12 and pulls recording media 12 through imaging plane 32 defined by a surface of vacuum roller 21. Vacuum roller 21 contains surface holes and holds the recording media in place by suctioning air through these surface holes via a vacuum created within vacuum roller 21.

First Embodiment

Figure 4:
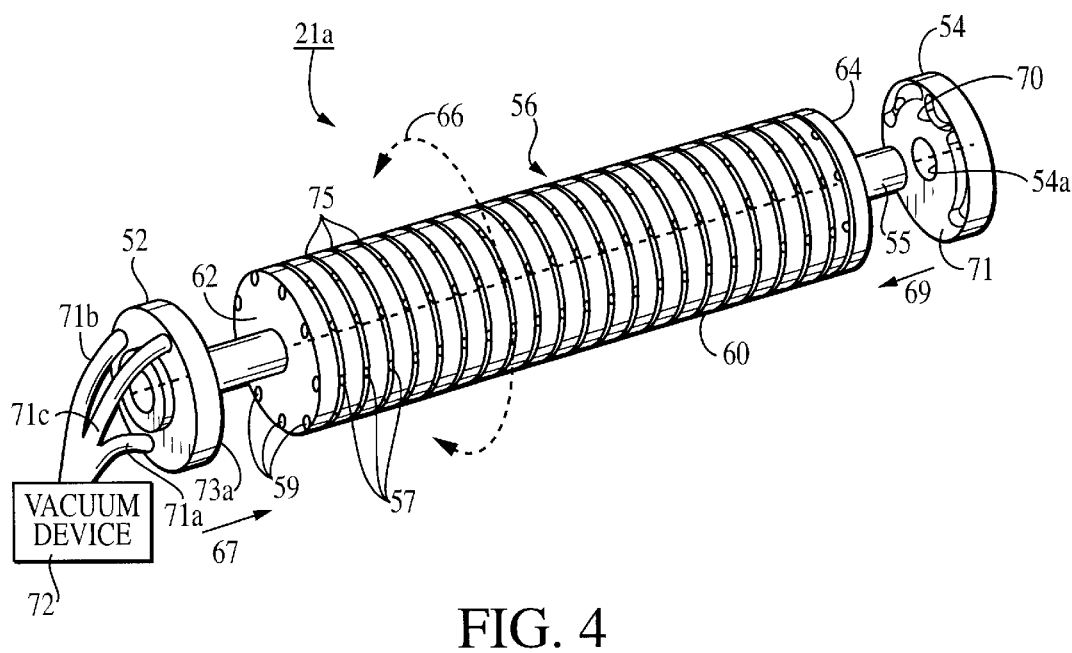
FIGS. 4 and 5 show perspective views of a vacuum roller used in the imaging system.
Figure 5:
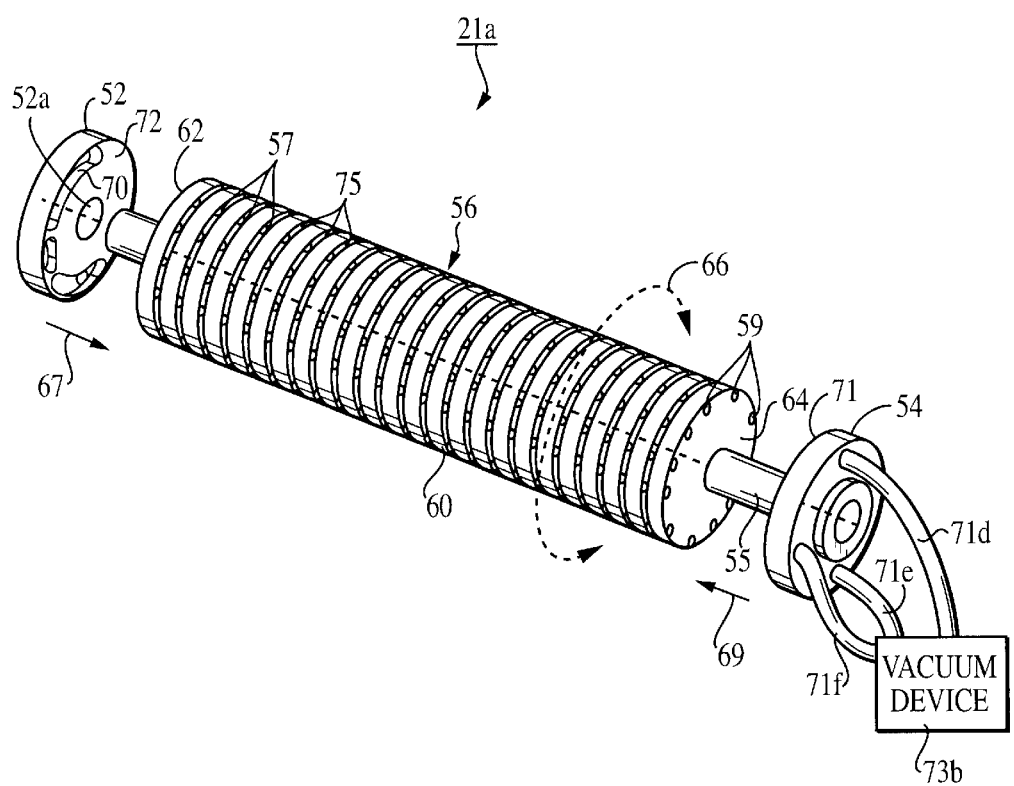

FIGS. 4 and 5 show close-up views of a vacuum roller 21a that may be used in imaging system 10. Vacuum roller 21a contains caps 52 and 54, axle 55, and roller 56.

Figure 11:
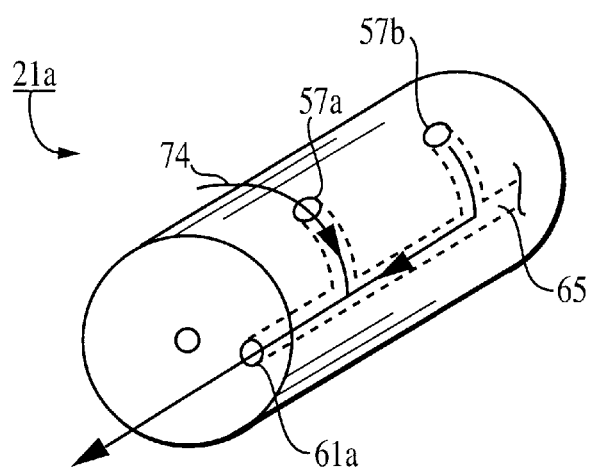
FIG. 11 shows a close-up view of air passageways created in the vacuum roller of FIGS. 4 and 5.

Roller 56 can be formed of plastic, metal, or any other material. Roller 56 contains surface holes 57 and transverse holes 59. Surface holes 57 are formed all, or part-way, through roller 56 and terminate at the surface 60 of roller 56. Transverse holes 59 are formed through the sides 62 and 64 of roller 56 and intersect with the surface holes to form air passageways 65 within roller 56 (see FIG. 11). As shown in FIG. 11, a single continuous air passageway 65 connects surface holes 57a and 57b and transverse hole 61a. The other surface and transverse holes of roller 56 also intersect to form similar air passageways.

Figure 6:
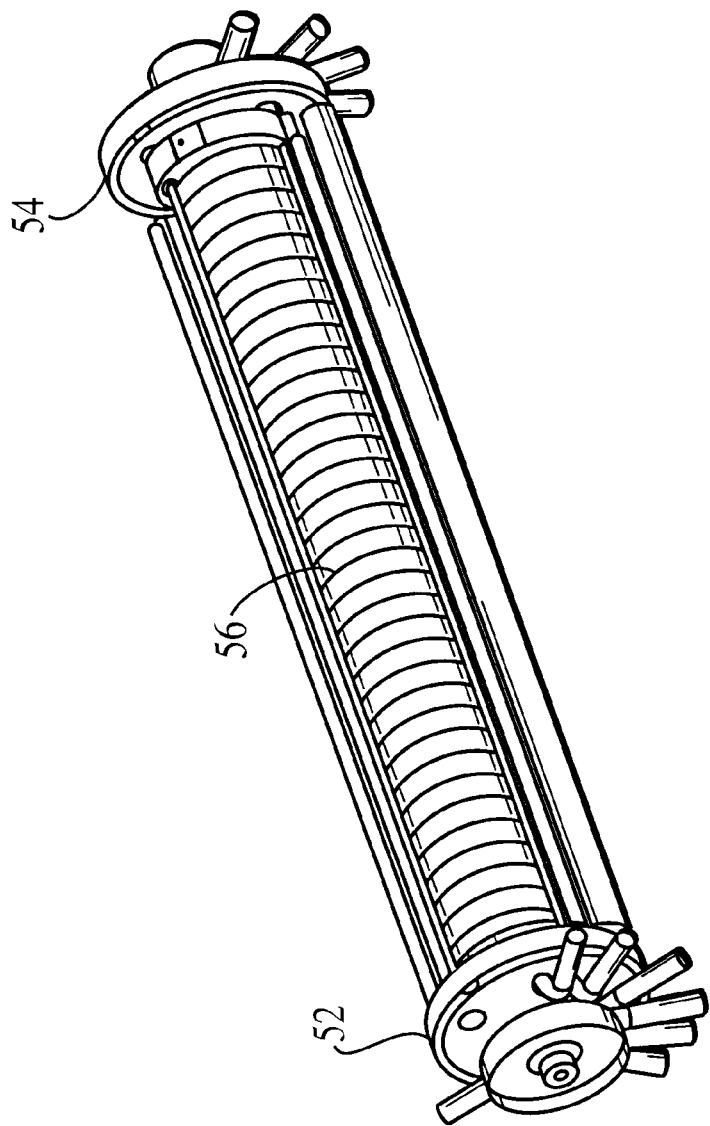
FIG. 6 shows a perspective view of the vacuum roller after it has been assembled.

Roller 56 is mounted on axle 55, which in turn rotates within bearing surfaces 52a and 54a of caps 52 and 54, respectively (in the directions of arrow 66). Caps 52 and 54 are mated to the sides 62 and 64, respectively, of roller 56. FIGS. 4 and 5 shows caps 52 and 54 before they are mated to roller 56. The caps are mated by sliding the caps along axle 55 in the direction of arrows 67 and 69. FIG. 6 shows caps 52 and 54 mated to roller 56. Caps 52 and 54 and roller 56 are mated so that a substantially air-tight seal is created between each cap and roller 56. What is meant by "substantially air-tight", in this context, is a seal that is air-tight or that has vacuum losses which do not significantly impair the functionality of vacuum roller 56. Furthermore, caps 52 and 54 are mated to roller 56 so that caps 52 and 54 are held substantially stationary while roller 56 rotates. Caps 52 and 54 may be held stationary by mechanically attaching them to an immobile portion of image processing system 10.

Caps 52 and 54 each include one or more cavities 70 on their inner surfaces 71 and 72. Caps 52 and 54 are mated to the sides of roller 56 so that the cavities 70 in those caps are aligned to each other. Cavities 70 also align to transverse holes in roller 56 as roller 56 rotates. Because caps 52 and 54 are stationary relative to roller 56, different transverse holes align with cavities 70 as roller 56 rotates.

Caps 52 and 54 include one or more vacuum connections 71a–71f, which lead to the interior of cavities 70. One or more vacuum devices 73a, 73b attach to the vacuum connections to evacuate the cavities 70. Evacuating cavities 70 creates a vacuum in the transverse holes that are aligned to the cavities. This also creates a vacuum in the surface holes that intersect those transverse holes. As a result, suction is produced at those surface holes. Arrow 74 in FIG. 11 shows the direction of air flow (i.e., vacuum/suction) produced by evacuating a cavity aligned to transverse hole 61a. The suction produced in this manner holds recording media 12 against vacuum roller 21a during transport and imaging.

Vacuum devices 73a, 73b may include internal (or external) valves or the like (not shown) for selectively controlling suction through vacuum connections 71a–71f. For example, vacuum devices 73a, 73b may selectively activate such valves to create vacuums via vacuum connections 71b and 71d only (which align). This results in a decrease in the vacuum area/imaging plane produced by vacuum roller 21a, since the vacuum area will be smaller. Selective control over vacuum connections may be performed for the "single cap" vacuum roller described below.

As roller 56 rotates, different transverse holes align to cavities 70; however, the area of roller 56 that contains the vacuum (imaging plane 32 of FIG. 1) remains stationary. This is because caps 52 and 54, and thus cavities 70 that produce the vacuum, are stationary relative to roller 56.

When recording media 12 comes into contact with imaging plane 32 of vacuum roller 21a, the suction produced by surface holes 57 pulls recording media 12. When recording media 12 is conveyed beyond imaging plane 32, the absence of vacuum beyond imaging plane 32 provides for relatively easy release of recording media 12 from vacuum roller 21a. That is, since there is relatively little or no vacuum beyond imaging plane 32 (there may be some vacuum resulting from the surface grooves described below), the recording media simply detaches from vacuum roller 21a.

The surface holes of vacuum roller 21a are arranged in rows and are at substantially equal distances from one another. This provides a relatively uniform vacuum in imaging plane 32. The size, number and locations of the surface holes and the transverse holes may vary, however, depending upon the desired vacuum level to be produced. Likewise, the holes need not be located at substantially equal distances from one another or in rows.

Figure 12:
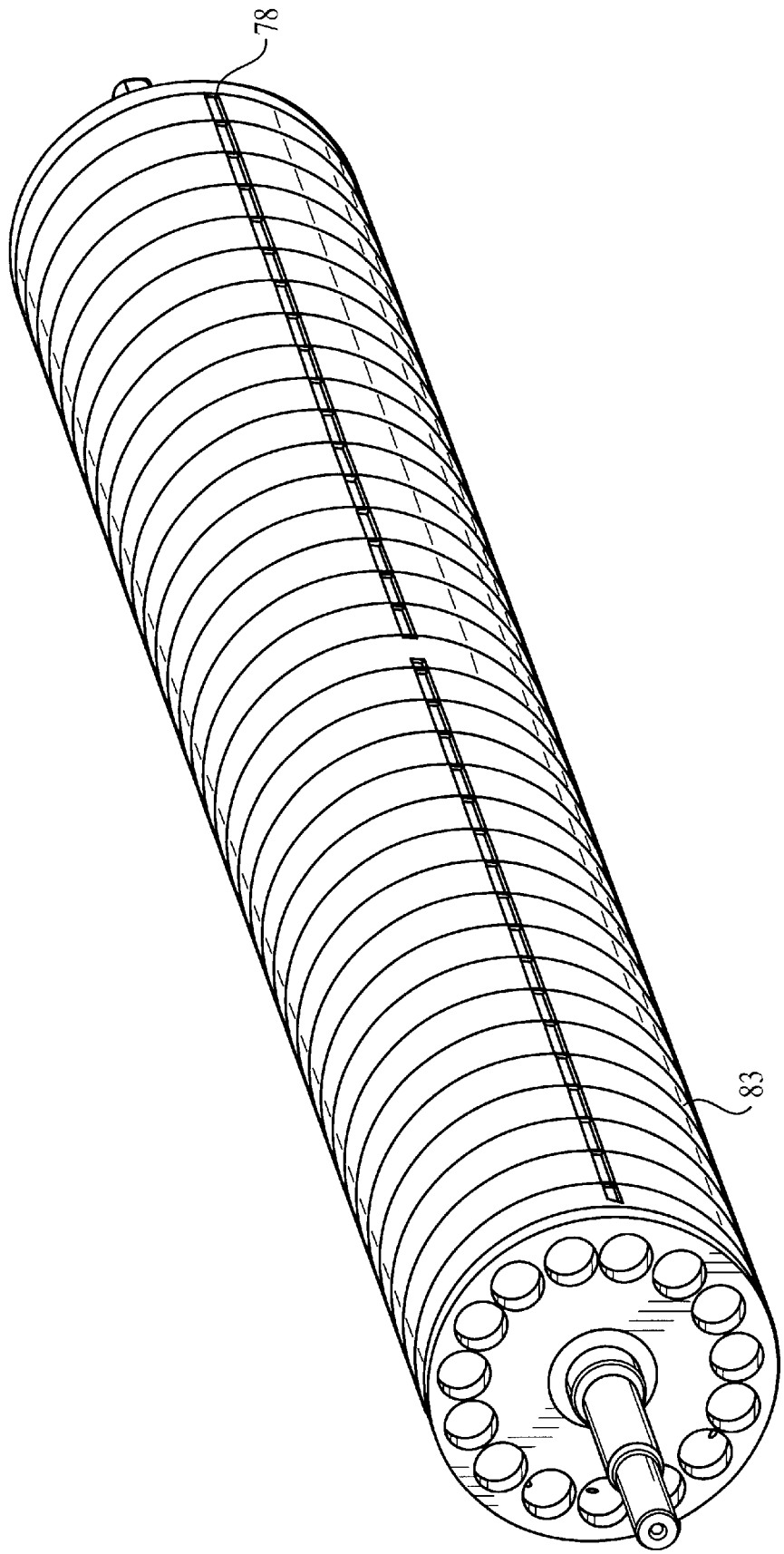
FIG. 12 shows a vacuum roller with transverse grooves.

Roller 56 also includes surface grooves 75. Surface grooves 75 are indentations in roller 56 that intersect with surface holes. Surface grooves 75 distribute the vacuum created by surface holes 57 over the surface of roller 56. Distributing the vacuum over the surface of roller 56 results in a better hold on recording media 12. Transverse surface grooves may also be included on roller 56 in addition to, or instead of, grooves 75. Transverse surface grooves 78 are shown in FIG. 12 for a vacuum roller 83 that is otherwise identical to vacuum roller 21a.

Roller 56 may be fabricated as a single piece or it may be segmented, meaning that it may include plural interconnected segments. Among the advantages of using plural interconnected segments are ease of conventional manufacture and the ability to vary the size of roller 56.

Although FIGS. 4 and 5 show a vacuum roller having two caps, the invention is not limited as such. Rather, vacuum roller 21a may include a single cap. In this case, transverse holes 59 extend only out to the side of vacuum roller 21a that mates to the single cap. On the other side of vacuum roller 21a, the transverse holes terminate prior to reaching the exterior, in order to permit a vacuum to be formed using the single cap.

Second Embodiment

Figure 7:
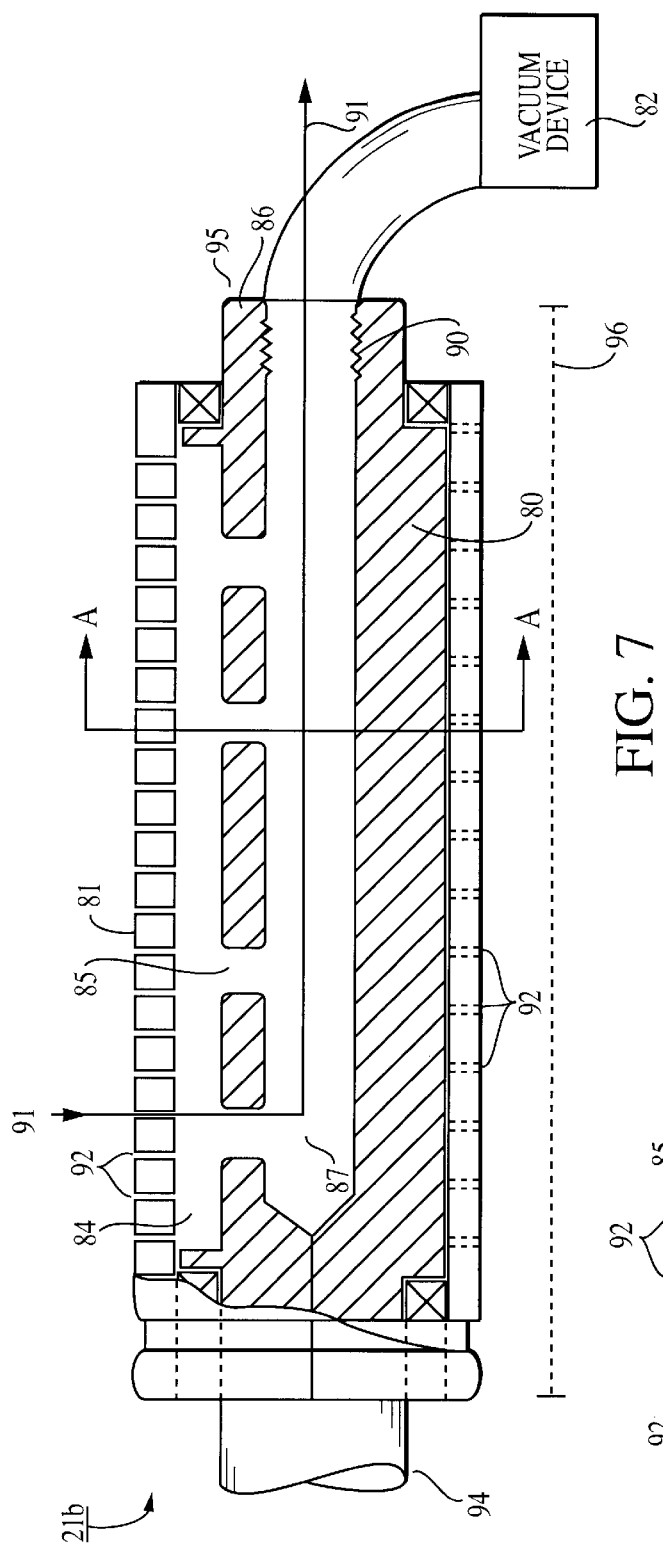
FIG. 7 shows a cut-away side view of another vacuum roller that may be used in the imaging system.
Figure 8:
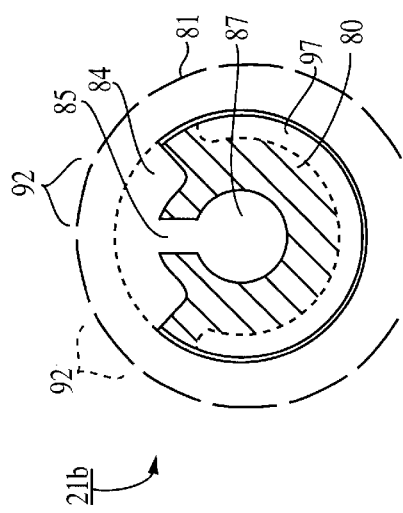
FIG. 8 shows a cut-away front view of the vacuum roller of FIG. 7.

FIG. 7 shows a cut-away side view of another vacuum roller 21b that may be used in imaging system 10; and FIG. 8 shows a cut-away front view of vacuum roller 21b taken along line A—A of FIG. 7. As shown in these figures, vacuum roller 21b includes stationary inner roller 80, outer roller 81, and a vacuum device 82.

Stationary inner roller 80 and outer roller 81 may be made from any type of material, such as molded plastic or metal. Vacuum device 82 may be a commercially available vacuum device capable of suctioning air to produce a vacuum. The vacuum produced should be strong enough to hold a recording medium against vacuum roller 21b. Therefore, different vacuum devices may be used for different types of recording media, as is the case for all vacuum devices/sources described herein.

Stationary inner roller 80 includes cavity 84, holes 85, and axle 86 containing throughbore 87. Axle 86 remains stationary during the rotation of outer roller 81 (described below). Axle 86 connects to vacuum device 82 via threading 90 (or any other type of connection). Vacuum device 82 suctions air out from throughbore 87 and holes 85 in order to evacuate cavity 84. The air flow resulting from vacuum device 82 is shown by arrow 91.

Outer roller 81 is concentric with stationary inner roller 80 and rotates about stationary inner roller 80. Outer roller 81 contains surface holes 92, which are similar to the surface holes on vacuum roller 21a (FIGS. 4 and 5). Surface holes 92 are arranged around the circumference of outer roller 81 in rows. Surface holes 92 are at substantially equal distances from one another in order to provide a relatively uniform vacuum in imaging plane 32. The size, number and locations of surface holes 92 may vary, however, depending upon the desired vacuum level to be produced, as was the case above. Likewise, the surface holes need not be located at substantially equal distances from one another or in rows.

Because inner roller 80 is substantially stationary, the location of cavity 84 and holes 85 does not change. On the other hand, the locations of surface holes 92 on outer roller 81 do change relative to inner roller 80. However, the rotation of outer roller 81 ensures that some surface holes 92 will align with cavity 84 during rotation. As a result, the vacuum area (i.e., imaging plane 32—FIG. 1) of vacuum roller 21b remains substantially stationary despite the rotation of outer roller 81.

As was the case in FIGS. 4 and 5, outer roller 81 may include surface grooves (not shown). These surface grooves are indentations in outer roller 81 that intersect with surface holes 92. The surface grooves distribute the vacuum from surface holes 92 over the surface of outer roller 81. Distributing the vacuum over the surface of outer roller 81 produces a better, more even, hold of the recording media, as noted above. Transverse grooves like those of FIG. 12 may also be included on vacuum roller 21b.

Outer roller 81 may be fabricated as a single piece or it may be segmented, meaning that it may include plural interconnected segments. Among the advantages of using plural interconnected segments are ease of manufacture and the ability to vary the size of vacuum roller 21b.

Although FIG. 7 shows a single vacuum connection 90, the invention is not limited as such. Rather vacuum roller 21b may include a vacuum connection on both sides 94 and 95. In this case, throughbore 87 extends the entire length 96 of inner roller 80. An additional vacuum may be added on side 94 to increase suction and/or to provide more uniform suction, if necessary. Likewise, several isolated cavities may be used in place of cavity 84 and those cavities may be selectively evacuated, as described above.

Inner roller 80 may also include a second stationary cavity 97 as shown by the dotted lines of FIG. 8. The second cavity may include a connection to cavity 84, such as a mechanical switch or the like (not shown), to release the vacuum in cavity 84. This may be used, e.g., to release recording media from the imaging plane without turning off vacuum device 82.

Third Embodiment

Figure 13:
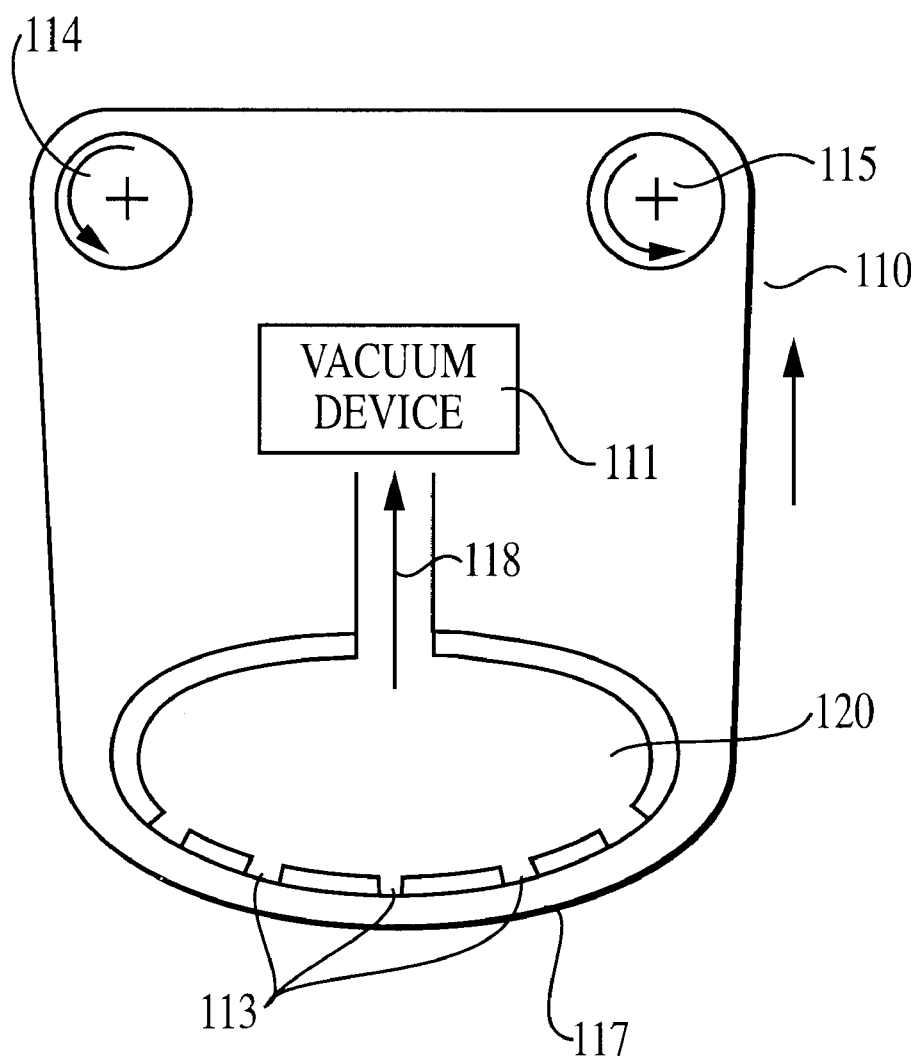
FIG. 13 is a diagram of a vacuum belt for capturing and pulling recording media through an imaging plane.

Instead of using a vacuum roller in imaging system 10, a belt may be used in place of vacuum roller 21 to pull recording media to and through imaging plane 32. Such a belt 110 is shown in FIG. 13. Belt 110 may be located in the same location in imaging system 10 as vacuum roller 21.

Belt 110 is driven around vacuum device 111, a cavity located in chamber 120, and rollers 114 and 115. Vacuum device 111 creates a vacuum area in the cavity, via suction, located over an imaging plane 117. Perforations 113 in belt 110 serve the same purpose as surface holes 57 in vacuum roller 21a. That is, the perforations move over the vacuum area and the vacuum from vacuum source 111 creates suction (in the direction of arrow 118) at a stationary imaging plane. This suction acts to pull recording media 12 to and through the imaging plane. As shown, chamber 120 may include holes adjacent to the perforations for regulating the suction.

Figure 14A:
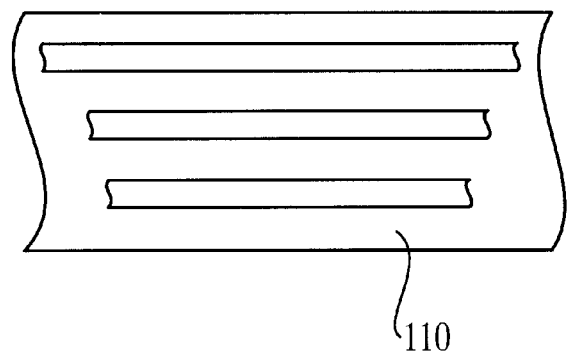
FIGS. 14a, 14b and 14c show perforations that may be included on the belt of FIG. 13.
Figure 14B:
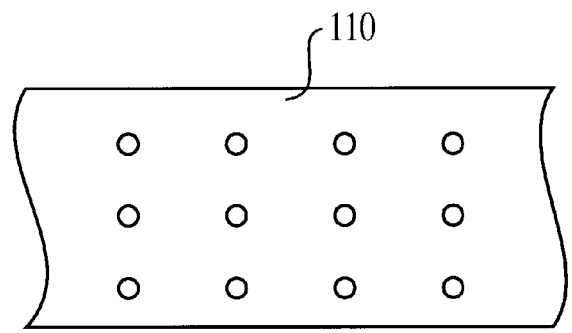
Figure 14C:
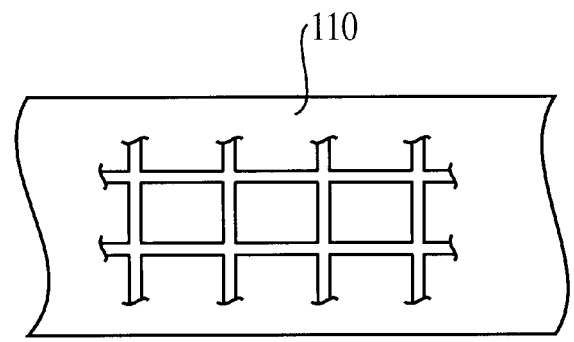

The perforations on belt 110 may be any shape. In FIG. 14a the perforations are slits; in FIG. 14b the perforations are holes; and in FIG. 14c the perforations are in a checkerboard pattern. These perforation designs are merely representative; others may also be used.

CONTROLLING TENSION IN RECORDING MEDIA

Referring back to FIG. 1, in order to maintain a substantially constant recording media velocity and direction, tension should be maintained in recording media 12 between rollers 19 and recording media cassette 11. This tension is controlled by controlling how recording media 12 is fed out of cassette 11.

Recording media 12 is stored in a roll 15 that is held on media spool 14 of cassette 11. The rate that recording media 12 is pulled out of cassette 11 is controlled by rollers 19 and corresponds to the diameter of the roll of recording media. As the diameter ("D") of roll 15 decreases, the rotational velocity of the roll increases. The result is an increase in tension of the recording media between cassette 11 and rollers 19.

Figure 9:
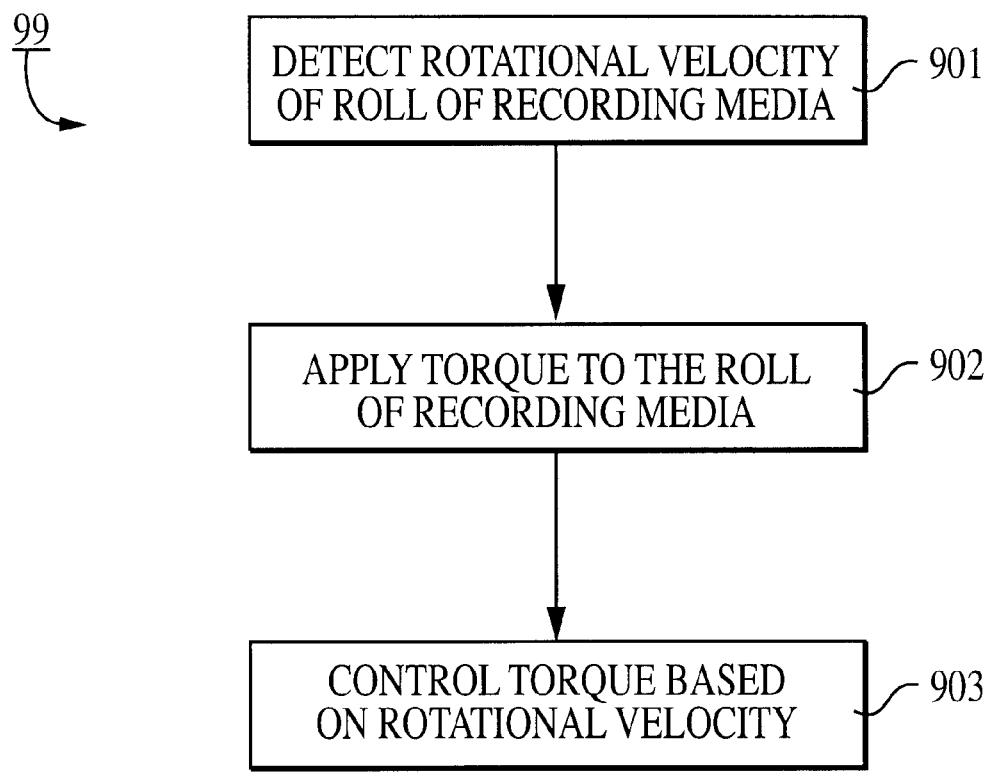
FIG. 9 is a flowchart showing a process for controlling tension in recording media used in the imaging system of FIG. 1.

To control this tension, imaging system 10 employs a process 99 (FIG. 9). Specifically, imaging system 10 controls motor 16 to vary the amount of resistance (i.e., torque) to feeding recording media 12 out of cassette 11 based on the rotational velocity of roll 15.

An encoder 100 (FIG. 1), which can be a digital tachometer or the like, is connected to motor 16 to detect (901) the rotational velocity of roll 15. Since the rotational velocity of the roll of recording media varies based on the diameter of the roll, there is no need to measure the diameter directly. However, direct measurements of the diameter may be used, if available.

Figure 10:
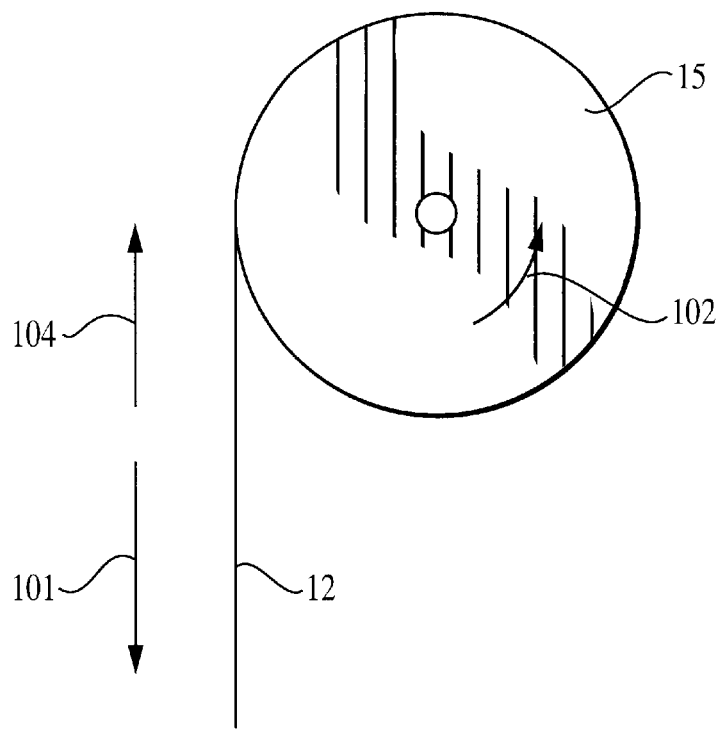
FIG. 10 is a block diagram showing recording media being fed and rewound from a roll of media.

The motor 16 applies (902) the torque to roll 15. The torque is applied in any direction in order to maintain tension. For example, referring to FIG. 10, if recording media 12 is being fed from roll 15 in direction 101, torque may be applied to roll 15 in direction 102 to decrease tension during feeding. Torque may be applied in the opposite direction as well to increase tension in the recording media.

A controller 103 (FIG. 1), such as a motor servo, controls (903) the torque applied by the motor based on the rotational velocity of the roll detected by encoder 100. Controller 103 controls the torque by varying the amount of current supplied to motor 16. To increase the torque, controller 103 increases the amount of current supplied to motor 16. This is done in response to a decrease in the rotational velocity of roll 15, which corresponds to an increase in the diameter of roll 15 (this may occur, e.g., when a new roll of media is loaded). To decrease the torque, controller 103 decreases the amount of current supplied to motor 16. This is done in response to an increase in the rotational velocity of roll 15, which corresponds to a decrease in the diameter of roll 15.

Motor 16 controls roll 15 through a coupling, such as one or more pulleys 17 connected to recording media cassette 11. For example, referring to FIG. 10, as noted, if recording media 12 is being fed from roll 15 in the direction of arrow 101, the applied torque will be in the direction of arrow 102 in order to decrease tension during feeding. Motor 16 can also be controlled to rewind recording media onto cassette 11, as described above. The "rewind" direction is shown by arrow 104 of FIG. 10.

Although a motor, encoder, and motor servo are described above to control torque, other devices may be used. For example, a digital controller may be used to control the motor based on the rotational velocity of the recording media. Other types of analog controls may be used as well. An electronic brake or an electronic clutch may be used in place of the motor to provide torque to the roll of recording media. Moreover, process 99 of FIG. 9 is not limited to use with imaging system 10. Rather, it may be used in any system, recording or otherwise, that requires tension in a medium being fed from a roll. Any one or more features of the apparatus and methods described herein may be combined to form a new embodiment not explicitly described.

Other embodiments not described herein are also within the scope of the following claims.

What is claimed is:

1. An apparatus for controlling tension in a recording medium fed from a roll, comprising:

an encoder which detects a rotational velocity of the roll as the recording medium is fed;

a motor which applies a torque to the roll to maintain tension in the recording medium; and a controller which controls the torque applied by the motor based on the rotational velocity of the roll.

2. The apparatus of claim 1, wherein the controller controls the torque applied by the motor by controlling an amount of current supplied to the motor.

3. The apparatus of claim 1, further comprising a media cassette for storing the roll of recording media.

4. The apparatus of claim 1, wherein the media cassette is removable and can be replaced with a second media cassette.

5. The apparatus of claim 1, wherein the motor is capable of applying sufficient torque to rewind the recording medium onto the roll.

6. The apparatus of claim 1, wherein the encoder comprises a digital tachometer that is capable of measuring the rotational velocity of the roll.

7. The apparatus of claim 1, wherein the controller comprises a motor servo.

8. The apparatus of claim 1, further comprising a coupling which is controlled by the motor to apply the torque to the roll.

9. The apparatus of claim 8, wherein the coupling comprises a pulley.

10. A method of controlling tension in a recording medium fed from a roll, comprising:

detecting a rotational velocity of the roll as the recording medium is fed;

applying a torque to the roll to maintain tension in the recording medium; and controlling the torque applied by a motor based on the rotational velocity of the roll.

11. The method of claim 10, wherein the torque is controlled by controlling an amount of current supplied to the motor.

12. The method of claim 10, wherein sufficient torque is applied to the roll to rewind the recording medium onto the roll.

13. The method of claim 10, wherein the rotational velocity of the roll is detected by a digital tachometer.

14. The method of claim 10, wherein the torque is controlled by a motor servo.

15. An imaging system comprising:

a cassette which holds a roll of recording media;

pinch rollers which feed a recording medium from the roll in the cassette;

a roller which holds the recording medium in place to transport the recording medium through an imaging plane defined by a surface of the roller;

a device which forms an image onto the recording medium at the imaging plane;

an encoder which detects a rotational velocity of the roll as the recording medium is fed;

a motor which applies a torque to the roll to maintain tension in the recording medium between the cassette and the pinch rollers; and a controller which controls the torque applied by the motor based on the rotational velocity of the roll.

16. The imaging system of claim 15, wherein the controller controls the torque applied by the motor by controlling an amount of current supplied to the motor based on the rotational velocity of the roll.

17. The imaging system of claim 15, wherein the motor is capable of applying sufficient torque to rewind the recording medium onto the roll.

18. The imaging system of claim 15, wherein the encoder comprises a digital tachometer that is capable of measuring the rotational velocity of the roll.

19. The imaging system of claim 15, wherein the controller comprises a motor servo.

20. The imaging system of claim 15, further comprising a coupling which is controlled by the motor to apply the torque to the roll.

21. The imaging system of claim 20, wherein the coupling comprises a pulley.

22. An apparatus for controlling tension in a medium fed from a roll, comprising:

detecting means for detecting a rotational velocity of the roll as the medium is fed;

applying means for applying a torque to the roll to maintain tension in the medium; and controlling means for controlling the torque applied by the applying means based on the rotational velocity of the roll.

23. An imaging system comprising:

a cassette which holds a roll of recording media;

pinch rollers which feed a recording medium from the roll in the cassette;

a roller using a vacuum to hold the recording medium in place to transport the recording medium through an imaging plane defined by a surface of the roller;

a punch operationally positioned between said pinch rollers and said roller for forming holes in the recording medium;

a device which forms an image onto the recording medium at the imaging plane;

an encoder which detects a rotational velocity of the roll as the recording medium is fed;

a motor which applies a torque to the roll to maintain a substantially uniform tension in the recording medium between the cassette and the pinch rollers; and a controller which controls the torque applied by the motor based on the rotational velocity of the roll.

24. The system of claim 23, wherein the rotational velocity of said vacuum roller is larger than the rotational velocity of said pinch rollers.

25. The system of claim 23, wherein the vacuum is up to three pounds per square inch when the recording medium thickness is between four thousands of an inch thick and eight thousands of an inch thick.

26. The system of claim 23, wherein the vacuum level is higher at a leading edge of the recording medium than at other portions of the recording medium.

27. The system of claim 23, wherein said imaging device comprises a laser beam.

* * * * *